United States Patent [19]

Fiechter

[11] 4,119,223
[45] Oct. 10, 1978

[54] VEHICLE MOUNTED CONVEYOR

[76] Inventor: Richard E. Fiechter, R.R. #1, Box 102, Craigville, Ind. 46731

[21] Appl. No.: 791,510

[22] Filed: Apr. 27, 1977

[51] Int. Cl.$^2$ .............................................. B60P 1/40
[52] U.S. Cl. ................... 214/83.26; 198/317; 198/318; 198/865; 214/83.32
[58] Field of Search ...................... 214/83.26, 520–522; 198/317, 318, 589, 560, 561, 865

[56] References Cited

U.S. PATENT DOCUMENTS

| | | | |
|---|---|---|---|
| 2,410,996 | 11/1946 | Patterson | 214/521 |
| 2,805,759 | 9/1957 | Manceau | 198/318 X |
| 3,498,483 | 3/1970 | Meharry | 214/83.26 |

Primary Examiner—Robert G. Sheridan
Attorney, Agent, or Firm—Gust, Irish, Jeffers & Rickert

[57] ABSTRACT

An upright post is affixed to a vehicle body adjacent a corner of that body. An elongated extensible support strut is mounted at one end in swivelled relation adjacent the bottom of the post. An elongated tube is mounted adjacent the upper tube end in swivelled relation to the upper end of the post. The tube is pivotably attached adjacent its lower end to the other end of the strut so that the tube and strut can swing about the post and towards and away from the post. Conveying means are mounted inside the tube to convey particle matter from the lower end to the upper end of the tube. A hopper is mounted adjacent the lower end of the tube and in particle flow communication with the conveyor. A discharge spout is mounted at the upper end of the tube in particle flow communication with the upper end of the conveyor. The tube may be swung outwardly of the vehicle for receiving particle flow near ground level with the conveyor transporting the particles to the upper end for discharge and loading into a vehicle compartment. Typically, the vehicle is used for farming operations. The tube, when not in use, may be swung and held alongside the vehicle in a stored position after the particle loading has been completed.

3 Claims, 5 Drawing Figures

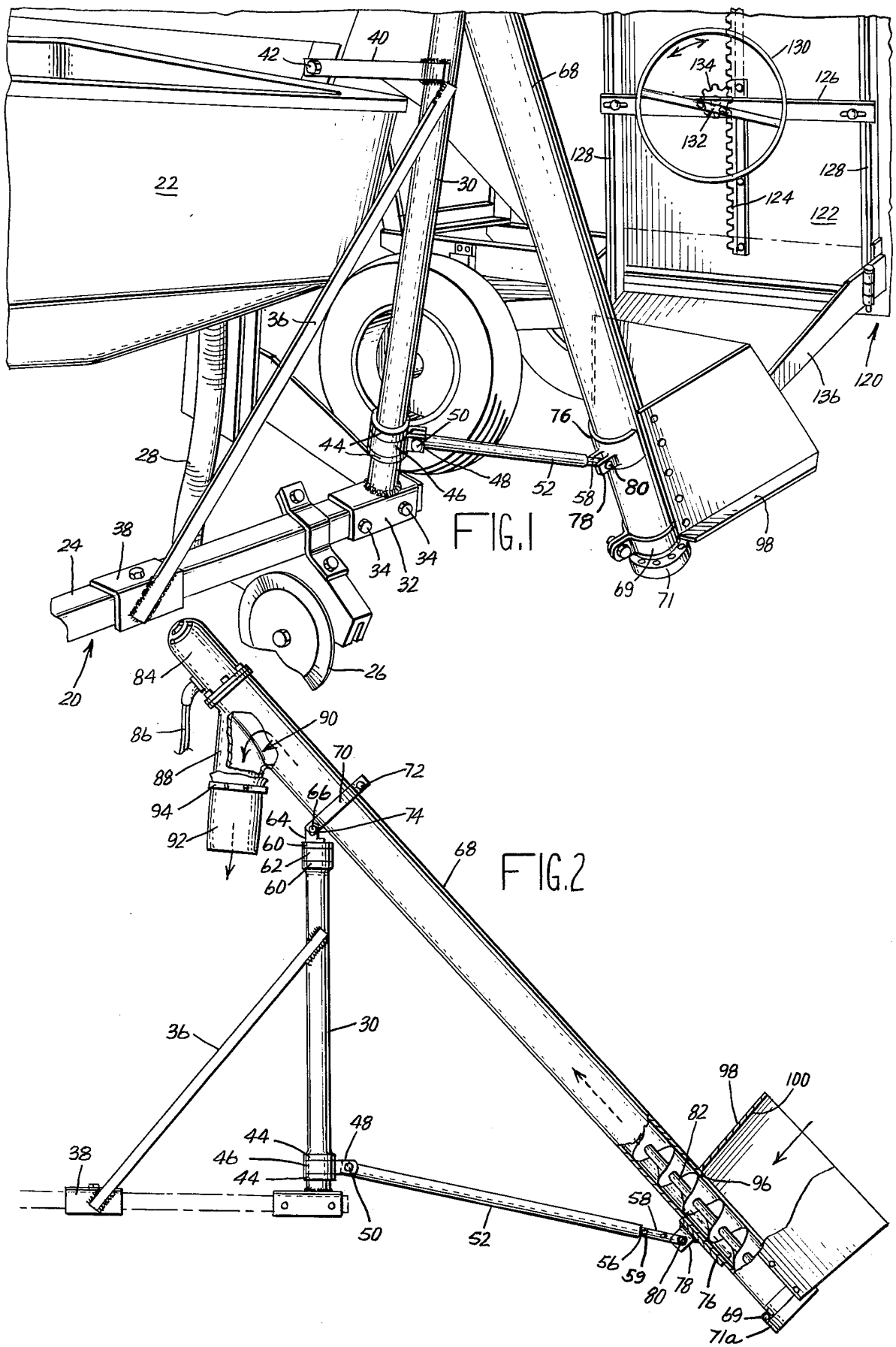

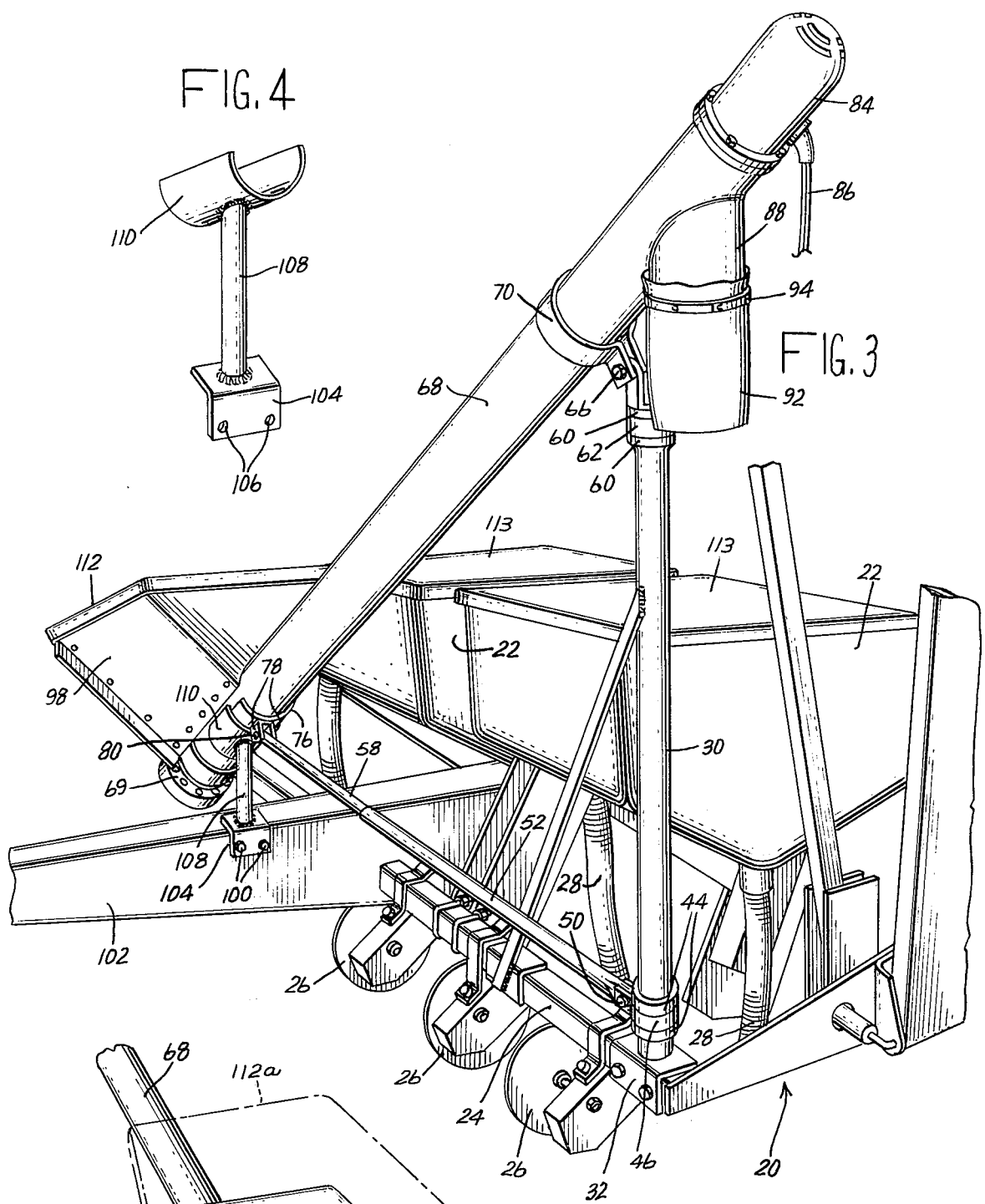
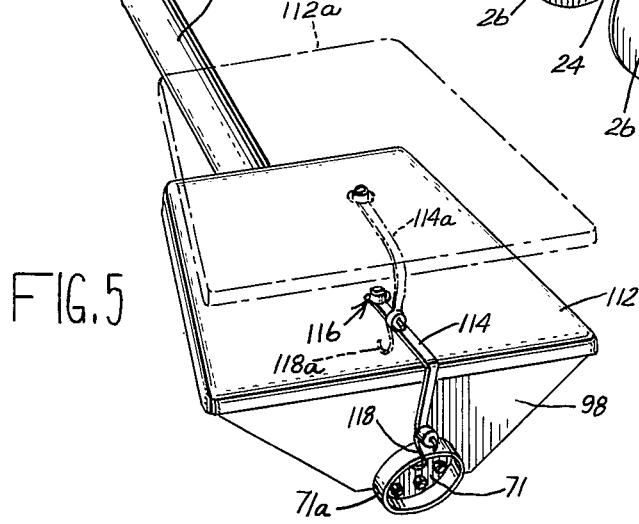

VEHICLE MOUNTED CONVEYOR

BACKGROUND OF THE INVENTION

1. Field of the Invention

This invention is in the field of vehicle mounted conveyors and, more particularly, conveyors for loading farm vehicles.

2. Brief Description of the Prior Art

In vehicle loading, and in particular, in loading farm vehicles, it is frequently necessary to transfer particle matter, such as fertilizer, from a lower level, such as ground level, to a higher level, such as the open top of bins in a corn planter. Typically, fertilizer is stored in a large trailer having an exit chute positioned between the trailer floor and the ground. A chute door may be raised to cause gravity discharge of the fertilizer through the door opening and down the chute. The discharged fertilizer would then be lifted by manual or mechanical devices to raised hoppers or bins positioned on a farm vehicle such as a corn planter. Manual shoveling of fertilizer results in fertilizer waste, is time consuming, is tiring to the farm operator, and creates an unhealthy atmosphere of fertilizer dust. Previous mechanical devices were relatively massive, complex, and expensive making their use difficult and uneconomical.

SUMMARY OF THE INVENTION

This invention provides a vehicle conveyor which is permanently mounted to the vehicle and may be manually swung between a loading position and a stored position. An upright post is rigidly mounted to the vehicle and an extensible strut is swivelled and pivoted at one strut end adjacent the lower post end. Thus, the strut may be swung about the post and also towards and away from the post. An elongated tube is swivelled and pivoted adjacent the upper tube end to the upper post end so that the tube is swingable about the post and pivotable towards and away from the post. The other strut end is pivoted to a point adjacent the lower tube end so that the tube may be swung from a loading position, wherein the tube is extending outwardly from the vehicle body, to a stored position, wherein the tube is held alongside the vehicle body. In storing, the tube end is raised, extending the strut, to provide adequate ground clearance of the lower tube end in the stored position. The conveyor may take the form of an auger which is rotatably mounted within the tube and rotatably driven by a motor positioned at the upper tube end.

It is therefore an object of this invention to provide a vehicle conveyor which is relatively low in cost, light in weight, and be mounted permanently to the vehicle.

It is a further object of this invention to provide in the conveyor in the previous object a device which is positionable to load the vehicle with particle matter which is received at or near ground level and is discharged into raised vehicle compartments.

It is a further object of this invention to provide a conveyor of the previous objects which may be manually swung to a stored position and held alongside the vehicle during vehicle operation.

DESCRIPTION OF THE DRAWINGS

FIG. 1 is a partial perspective view of an embodiment of this invention shown in the loading position;

FIG. 2 is a partially sectioned side elevational view of the embodiment of FIG. 1;

FIG. 3 is a partial perspective view of a conveyor of this invention shown in this stored position;

FIG. 4 is an enlarged perspective view of the storing support; and

FIG. 5 is a perspective view of the conveyor hopper having a hopper lid which is shown in removed position in dot-dash lines.

DESCRIPTION OF A PREFERRED EMBODIMENT

Referring to the drawings, a vehicle 20, which is a corn planter having seed compartments or bins 22 affixed at the rearward end thereof, has an elongated transverse cross-bar 24 rigidly mounted to the vehicle frame. Transversely spaced along bar 24 are a series of rotatable planting discs 26. Aligned with each of the discs 26 is a fertilizer duct 28 depending from bin 22 to deposit the corn seed the ground immediately behind its respective disc 26, which fertilizer is planted in the furrow made by disc 26, as is conventional. This is an example of the vehicle with which this invention may be used.

An elongated upright post 30 is affixed as by welding, to a mounting bracket 32 which is bolted, as with bolts 34, to bar 24. Brace 36 is affixed, as by welding, at its lower end to bracket 38 which is affixed, as by welding, to bar 24. The upper end of brace 36 is affixed, as by welding, to post 30. A second brace 40 is affixed at one end, as by welding, to post 30 and is attached, as with bolt 42, to the vehicle frame. thus, post 30 is rigidly mounted to the vehicle frame. Post 30 has adjacent its lower end a pair of longitudinally spaced guide rings 44. A collar 46 is placed between and guided by rings 44 and is mounted in swivelled relation to post 30. Collar 46 has a pair of spaced extensions 48 which support a pivot pin 50. An elongated strut 52 has an opening 54 at one end thereof which receives pin 50 so that strut 52 may be swung about post 30 and also pivoted towards and away from post 30. The strut 52 telescopically receives rod 58 making rod assembly 52, 58 extensible. Cross pin 59 is removably fitted into companion openings in rod 58 for engagement with the end 56 of strut 52 to hold the strut assembly to an adjusted length and to hold the hopper 98 to an adjusted height.

A pair of longitudinally spaced guide rings 60 are affixed as by welding to the upper end of post 30. Collar 62 is placed between and guided by rings 60 and is in swivelled relation to post 30. Collar 62 has an arm 64 affixed thereto and extending therefrom, which arm supports a bolt 66. An elongated tube 68 has flanged sleeve 69 affixed as by welding to the lower end thereof. A cover 71 having an annular flange 71a is bolted to sleeve 69 to close the lower end of tube 68. A pair of arcuate clasps 70 are placed on either side of tube 68 adjacent its upper end. Clasps 70 are attached at one end as with bolt 72. The other ends of clasps 70 have openings to pivotally receive bolt 66 which is threaded to receive nut 74. Affixed as by welding to the lower end of tube 68 is arcuate bracket 76 having a pair of spaced extensions 78 supporting a pin 80 therebetween. The outer end of rod 58 has an opening for pivotally receiving pin 80.

Rotatably supported within tube 68 is an auger 82 which is rotatably driven by a motor 84 attached to an upper end of tube 68. Power leads 86 from the vehicle battery and an operating switch, not shown, are attached to motor 84 for selective operation thereof. A tubular discharge spout 88 is affixed, as by welding, to, and depends from, the lower side of tube 68 over discharge opening 90. A flexible sleeve 92 is fitted over the end of spout 88 and held thereto by band 94. Sleeve 92 may be formed as desired to control the discharge pattern of the particle flow. On the upper side of tube 68, at the lower end thereof, is an input opening 96 and affixed, as by welding, to tube 68 over opening 96 is hopper 98 having opening 100.

Rigidly attached to planter 20 is an elongated towing beam 102. A bracket 104 is attached as by bolts 106 to beam 102. A shaft 108 is attached as by welding to the upper surface of bracket 104 and extends upwardly therefrom. An arcuate support 110 is affixed as by welding in angled relation to the upper end of shaft 108 and, as will become apparent, provides support for tube 68 in its stored position.

Thus described, it is seen that tube 68 may be swung about post 30 by virtue of the swivelled relation between collars 46 and 62 with post 30, from the loading position shown in FIG. 1 to the stored position shown in FIG. 3. In the stored position, tube 68 is pivoted away from post 30, extending rod 58 from strut 52, and is lifted over and nested in support 110.

Referring to FIG. 5, hopper 98 is fitted with lid 112 which may be held in place by strap 114 when the hopper is not in use. One end of strap 114 is attached to lid 112 as with bolt 116 and the other end of strap 114 carries hook 118 which may be placed over flange 71a to hold lid 112 in place. Lid 112 is shown in removed position 112a.

Referring to FIG. 1, a trailer 120, of conventional design, has a vertically slidable door 122 to which is attached a toothed rack 124. A cross brace 126, attached as with bolts to door guides 128, rotatably carries central post 132 of wheel 130. Fixedly attached to post 132 of wheel 130 is a pinion 134 which is engaged with rack 124. It is seen that by manual turning of wheel 130, door 122 may be raised or lowered. At the bottom of door 122 is discharge chute 136.

In operation, assuming the conveyor is in its stored position as shown in FIG. 3, tube 68 is lifted from support 110 and swivelled approximately 180° to its loading position shown in FIG. 1 wherein flange 71a is ground supported. Lid 112 is removed from hopper 98 and opening 100 is placed adjacent chute 136. Door 122 is then opened by turning wheel 130 in a counterclockwise direction causing particles, such as fertilizer, to be discharged from trailer 120 into hopper 98. At this time motor 84 is energized to cause auger 82 to rotate in a direction to carry the fertilizer from hopper 98 upwardly through tube 68 into discharge opening 90, through spout 88 and through sleeve 92 to deposit the fertilizer in bin 22. Thus, the fertilizer is mixed in the seed prior to planting. In actual practice, the fertilizer is deposited in a distribution device, not shown, which will distribute the fertilizer evenly in the bins 22 of planter 20. Once the proper amount of fertilizer has been deposited in bins 22, door 122 in trailer 120 is closed by clockwise rotation of wheel 120, and motor 84 is switched off. Lid 112 is placed over hopper 98 and strap 114 is attached by hook 118 to flange 71a. Tube 168 may then be manually lifted and swung approximately 180° until it is nested in support 110. The planter may be then tractor-drawn in the field. Tube 68 is held alongside the planter and does not interfere with planter operation. If additional seed and/or fertilizer is required, the planter may be re-supplied from any trailer at any location without the need of an individual loading mechanism. Due to the flexibility of movement of tube 68, various loading heights may be accommodated for load reception. The design is relatively inexpensive so that each planter may be supplied with its own conveyor mechanism and is rigid in design so that travel with the planter will not cause conveyor failure. Lids 113 may be placed over bins 22 after loading thereof.

While there have been described above the principles of this invention in connection with specific apparatus, it is to be clearly understood that this description is made only by way of example and not as a limitation to the scope of the invention.

What is claimed is:

1. Apparatus for particle conveyance comprising:
   a vehicle for ground transportation having a vehicle frame;
   a container being mounted in said vehicle;
   a substantially upright post being rigidly mounted at its lower end to said vehicle; means for rigidly bracing said post at an intermediate portion to said frame;
   an elongated supporting strut mounted at one end in swivelled relation to said post and being mounted for pivotal movement about a first axis transverse to the axis of said post;
   an elongated tubular member mounted in swivelled relation to said post above said strut mounting and mounted for pivotal movement about a second axis transverse to the axis of said post;
   said strut having a strut rod telescoped into said strut and extensible from said strut;
   said member being connected to said strut rod for pivotal movement about a third axis substantially parallel to said first axis;
   a vehicle tow bar rigidly mounted to and extending forwardly from said frame; and
   means for supporting said member in a stored position being rigidly mounted to said tow bar.

2. The apparatus of claim 1 wherein said means comprises an arcuate cradle into which the lower end portion of said tubular member gravitationally nests.

3. The apparatus of claim 2 wherein said cradle is angularly disposed to said tow bar to obliquely support said member.

* * * * *